United States Patent [19]

Acampora et al.

[11] 4,252,999
[45] Feb. 24, 1981

[54] SIGNALING AND RANGING TECHNIQUE FOR A TDMA SATELLITE COMMUNICATION SYSTEM

[75] Inventors: Anthony Acampora, Freehold; Rollin E. Langseth, Colts Neck; Douglas O. Reudink, Sea Girt; Yu S. Yeh, Freehold Township, Monmouth County, all of N.J.

[73] Assignee: Bell Telephone Laboratories, Incorporated, Murray Hill, N.J.

[21] Appl. No.: 948,381

[22] Filed: Oct. 4, 1978

[51] Int. Cl.² .............................................. H04J 3/06
[52] U.S. Cl. ................................. 370/104; 370/111; 370/97
[58] Field of Search .................. 179/15 BS, 15 BY; 325/4, 2, 1; 178/69.1

[56] References Cited

U.S. PATENT DOCUMENTS

| | | | |
|---|---|---|---|
| 3,530,252 | 9/1970 | Puente | 179/15 BS |
| 3,566,267 | 2/1971 | Golding | 325/4 |
| 3,639,838 | 1/1972 | Kuhn et al. | 325/4 |
| 3,654,395 | 4/1972 | Schmidt | 179/15 BS |
| 3,754,102 | 8/1973 | Clark | 179/15 BS |
| 3,772,475 | 11/1973 | Loffreda | 179/15 BS |
| 3,778,715 | 12/1973 | Schmidt et al. | 179/15 BS |
| 3,843,843 | 10/1974 | Solomon et al. | 179/15 BS |
| 4,054,753 | 10/1977 | Kaul et al. | 179/15 BS |
| 4,107,608 | 8/1978 | Saburi | 179/15 BS |

OTHER PUBLICATIONS

"A Scanning Spot-Beam Satellite System", by Reudink et al., *The Bell System Technical Journal*, vol. 56, No. 8, Oct. 1977, pp. 1549-1560.
"Burst Synchronization for Domestic TDMA Systems", by Samejima, et al., *Review of the Electrical Communication Labs.* vol. 26, Nos. 1-2, Jan.-Feb., 1978; pp. 118-126.

Primary Examiner—Douglas W. Olms
Attorney, Agent, or Firm—Erwin W. Pfeifle

[57] ABSTRACT

The present invention relates to a technique for creating dedicated in-band, two-way, signaling channels between a master signaling ground station and each remote ground station of a satellite communication system using either an area coverage beam or a plurality of fixed and/or scanning spot beams. In the present technique, separate bursts of information within a superframe sequence are dedicated for only providing signaling information between the master signaling station and each ground station of the system. Each ground station, in turn, is dedicated a separate burst of information for transmitting only signaling information back to the master signaling station. Coarse ranging is performed by triangulation methods and then each ground station transmits a unique word within the predetermined time period of its dedicated signaling burst to the master signaling station. The master signaling station then transmits synchronization correction information back to each ground station in its dedicated signaling burst.

11 Claims, 6 Drawing Figures

FIG. 3
UP LINKS
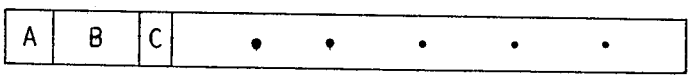
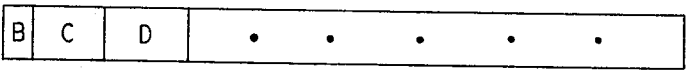
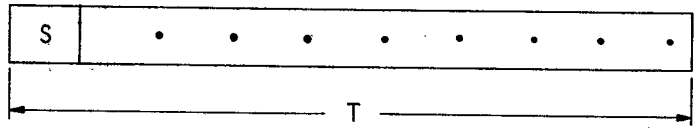
FIG. 4
(PRIOR ART)
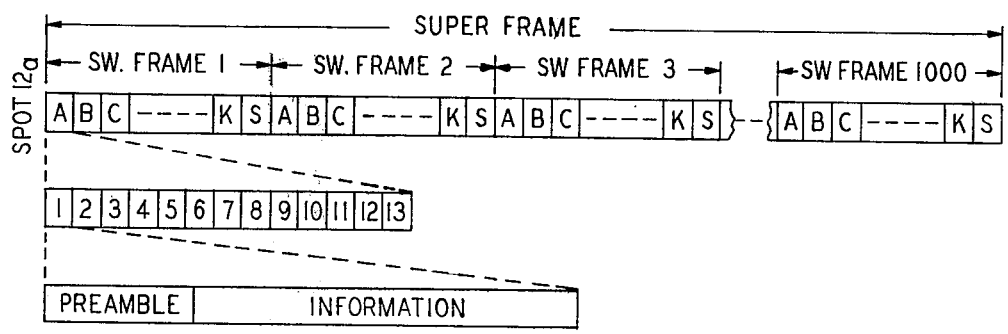

SIGNALING AND RANGING TECHNIQUE FOR A TDMA SATELLITE COMMUNICATION SYSTEM

TECHNICAL FIELD

The present invention relates to a signaling and ranging technique for a TDMA satellite communication system and, more particularly, for providing a signaling and ranging technique by creating dedicated in-band, two-way, signaling channels in a superframe format between a master signaling ground station and each ground station of a satellite communication system.

BACKGROUND ART

The early satellite communication system designs employed an area coverage beam which provided interconnections on either a time-division multiple access (TDMA) basis or a frequency-division multiple access (FDMA) basis. Such designs had the disadvantage of low antenna gain and frequency reuse only by the use of polarization techniques. More recent designs use (a) multiple narrow-angle fixed spot beams with on-board satellite switching to provide frequency reuse, high capacity, and high antenna gain, (b) a single scanning beam to provide high antenna gain, (c) the combination of an area coverage beam and multiple narrow-angle fixed spot beams to provide high capacity, and (d) the combination of multiple narrow-angle fixed spot beams and a single scanning beam with on-board satellite switching.

In such systems, all transmissions from all ground stations are relayed through the satellite to the destined ground stations and any desired transmission format may be employed. In the TDMA systems, each of the stations transmit signals in the same frequency spectrum but in different time slots of a frame or superframe format so that the transmissions arrive in a preselected order at the satellite with no overlap. Signaling between ground stations has been accomplished by the use of separate telemetry channels in different frequency bands or by in-band signals in the preamble of the various bursts of information in each time slot.

A typical prior art technique used for in-band signaling is disclosed in U.S. Pat. No. 3,772,475 issued to A. Loffreda on Nov. 13, 1973. There, a superframe format with frame segmented signaling is used in a TDMA area coverage satellite communication system wherein destination signaling is time divided in the preambles of dedicated bursts of information throughout the superframe in a predetermined format.

Ranging and burst synchronization are also necessary in TDMA satellite communication systems to avoid overlapping transmissions arriving at the satellite. Coarse ranging of the distance of the satellite from each earth station can be accomplished by the well known technique of triangulation to provide coarse burst synchronization. Fine burst synchronization has been accomplished using various techniques. For example, in U.S. Pat. No. 3,639,838 issued to H. G. Kuhn et al on Feb. 1, 1972 a TDMA area coverage satellite communication system is disclosed wherein each ground station is allotted a number of sequential or randomly disposed time slots for transmission and, in addition, a frame synchronizing burst S during each frame.

In U.S. Pat. No. 3,754,102 issued to J. M. Clark on Aug. 21, 1973 a TDMA satellite communication system is disclosed wherein ground station transmissions are assigned in a superframe format which is divided into equal parts called "midframes" with each midframe comprising 15 subframes with odd subframes having an extra bit for transmitting signaling information and long and short sync code signals between ground stations.

The problem remaining in the prior art is to provide an in-band, two-way, signaling and ranging technique which avoids coupling signaling and ranging information bits to portions of a time slot also used for normally transmitting bursts of information of data between any two ground stations. By so coupling signaling information bits with information or data bits within a time slot burst, an inefficient format results since, if no traffic momentarily exists between two ground stations, the time slot must still be dedicated for possibly transmitting only the signaling information between the two stations.

SUMMARY OF THE INVENTION

The foregoing problem has been solved in accordance with the present invention which relates to a signaling and ranging technique for a TDMA satellite communication system wherein separate dedicated in-band, two-way, signaling channels in a superframe format are created between a master signaling ground station and each of the other ground stations for only interchanging signaling and synchronization information.

It is an aspect of the present invention to provide a signaling technique between a master signaling ground station and all other ground stations by dedicating separate bursts of information within a TDMA superframe transmission sequence for only providing signaling information between the master signaling station and each of the ground stations of the system. Each ground station, in turn, has a separate burst of information dedicated thereto for transmitting only signaling information back to the master signaling station to provide the two-way signaling capabilities.

It is another aspect of the present invention to accomplish fine ranging or burst synchronization by causing each ground station to periodically transmit a unique word during a predetermined time period within the burst of information strictly dedicated for transmission of signaling information by that station to the master signaling station. The master signaling station, in turn, transmits synchronization correction information back to each ground station in its dedicated signaling burst to appropriately synchronize the burst transmission times of each ground station.

Other and further aspects of the present invention will become apparent during the course of the following description and by reference to the accompanying drawings.

BRIEF DESCRIPTION OF THE DRAWING

Referring now to the drawings, in which like numerals represent like parts in the several views:

FIG. 3 illustrates an exemplary switching frame sequence format similar to FIG. 2 except that the subframes are assigned according to exemplary varying traffic needs;

FIG. 4 illustrates an exemplary prior art superframe, frame, subframe and transmission burst format for a particular one of the up-link spot beams of FIG. 2;

DETAILED DESCRIPTION

Figure 1:
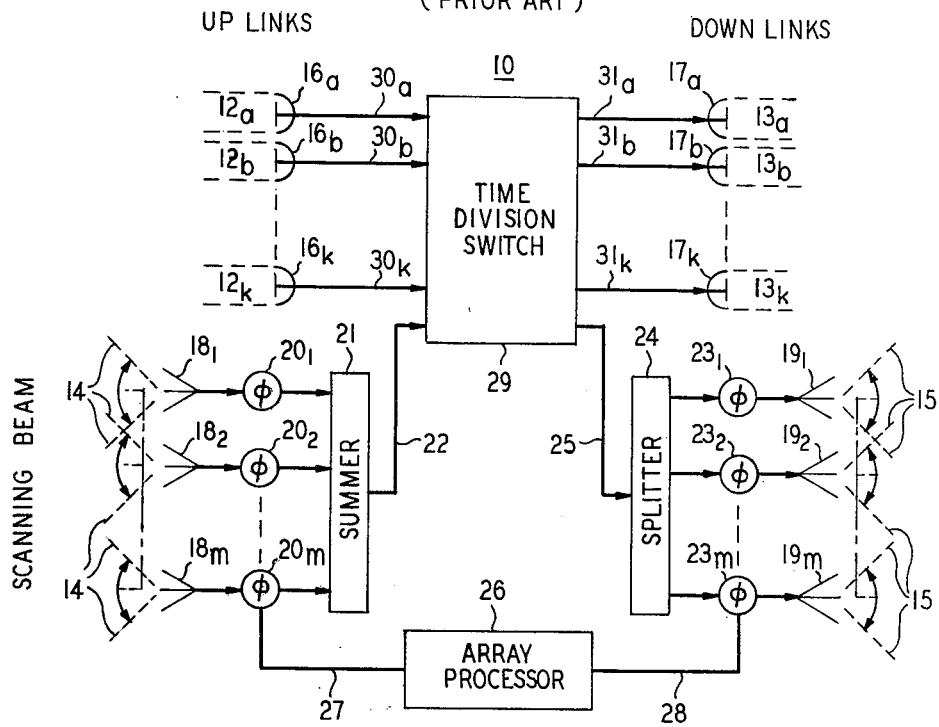
FIG. 1 is a block schematic of a prior art satellite time-division interconnection arrangement for selectively interconnecting a plurality of fixed up-link spot beams and an up-link scanning spot beam with a plurality of fixed down-link spot beams and a down-link scanning spot beam.

FIG. 1 illustrates a prior art basic satellite switching repeater 10 configuration for concurrently transmitting and receiving a plurality of fixed spot beams and one scanning spot beam. Such configuration is being described only to provide background information to permit subsequent illustration of how the present signaling and ranging technique can be applied for ground stations associated with TDMA satellite systems using either an area coverage beam, fixed spot beams, scanning spot beams or some combination of such beams.

For illustrative purposes hereinafter only, 11 up-link and 11 down-link fixed spot beams designated $12a-12k$ and $13a-13k$, respectively, and a scanning up-link and down-link spot beam designated 14 and 15, respectively, are shown. Each of the associated up-link and down-link fixed spot beams $12a$, $13a$; $12b$, $13b$; . . . ; $12k$, $13k$ are received from and transmitted to a separate fixed geographical ground area (not shown) within the viewing area of satellite switching repeater 10. The up-link and down-link scanning spot beams 14 and 15 are scanned independently among a plurality of spaced-apart geographical ground areas (not shown) which do not form a part of the geographical ground areas associated with the various fixed spot beams 12 and 13.

For illustrative purposes hereinafter only, the plurality of corresponding spaced-apart geographical ground areas associated with scanning spot beams 14 and 15 will be considered to include ninety-nine separate areas. It is also to be assumed that each of the 11 fixed spot beams associated ground areas will include 100 separate ground stations and that each of the scanning spot beam geographical ground areas include 10 separate ground stations, each desiring to communicate with any of the other ground stations in the same or other geographical ground areas.

Each of the up-link fixed spot beams $12a-12k$ are shown being intercepted or received at antennas $16a-16k$, respectively, while each of the down-link fixed spot beams $13a-13k$, are launched by antennas $17a-17k$, respectively. The up-link and down-link scanning spot beams 14 and 15 are respectively received and transmitted by, for example, a phased array antenna as shown in FIG. 1 where the up-link receiving array and down-link transmitting array are each shown as comprising a plurality of m elements $18_1-18_m$ and $19_1-19_m$, respectively. The receiving antenna elements $18_1-18_m$ are connected to phase shifters $20_1-20_m$, respectively, which, in turn, are connected to a summing circuit 21 for combining the output signals from phase shifter circuits $20_1-20_m$ into a single combined output signal on lead 22. Similarly, the input terminal of the down-link transmitting antenna elements $19_1-19_m$ are connected to the output terminals of phase shifters $23_1-23_m$, respectively, with the input terminal of phase shifters $23_1-23_m$ being connected to the output terminals of a splitting circuit 24. Splitting circuit 24 receives the instantaneous signal to be transmitted via scanning spot beam 15 on lead 25 and divides the signal equally for distribution to phase shifters $23_1-23_m$ which alters the phase of the associated input signal in a manner to cause elements $19_1-19_m$ to transmit scanning spot beam 15 in the desired direction as is well known in the art.

In the operation of each of scanning spot beams 14 and 15, an array processor 26 transmits a sequence of control signals over a bus 27 to each of the up-link phase shifters $20_1-20_m$ to cause the array to scan spot beam 14 over the associated scanning spot beam geographical ground areas in synchronization with the expected reception of signals from such ground areas. Concurrent therewith, the array processor 26 similarly transmits a separate sequence of control signals over a bus 28 to each of the down-link phase shifters $23_1-23_m$ to cause the array to scan spot beam 15 over the associated scanning spot beam geographical ground areas in synchronization with the expected transmission of signals to such areas.

The up-link signals concurrently received via fixed spot beams $12a-12k$ and scanning spot beam 14 form separate input signals on leads $30a-30k$ and 22, respectively, to a time-division switching matrix 29. These input signals are concurrently and selectively switched by the space and time-division switching matrix 29 to the appropriate output lead $31a-31k$ and 25 for transmission via down-link fixed spot beams $13a-13k$ and scanning spot beam 15, respectively. For the exemplary 11 fixed and one scanning spot beam, time-division switch 29 would comprise a $12 \times 12$ array of microwave switches and their associated drivers (not shown) which would be under control of a clock and switching sequencer (also not shown).

Figure 2:
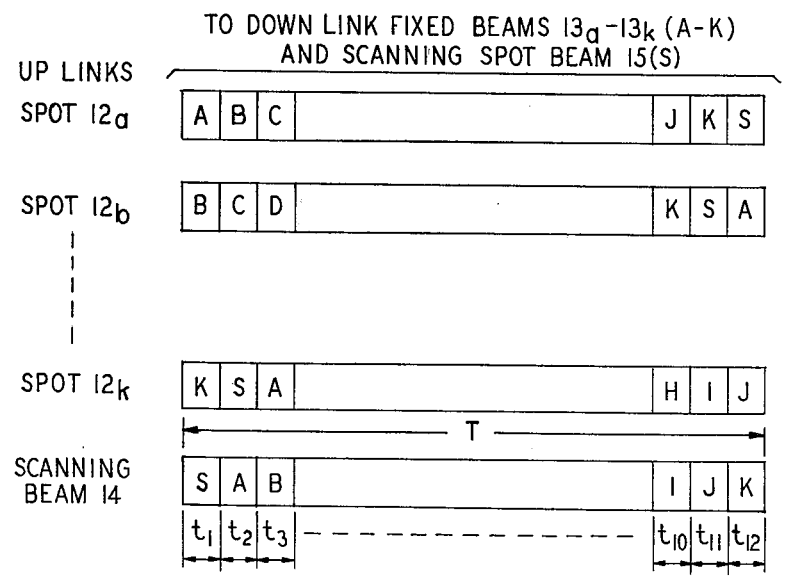
FIG. 2 illustrates an exemplary prior art switching frame sequence format for concurrently interconnecting 11 up-link fixed spot beams and one up-link scanning spot beam with 11 down-link fixed spot beams and one down-link scanning spot beam for use with the arrangement of FIG. 1.

The dynamic switching of the satellite switching matrix 29 is divided into a sequence of time intervals which are combined into a frame interval as shown in FIG. 2 for a typical sequence for use with a time-division multiplex mode of operation.

For purposes of illustration, it will be assumed that there is equal traffic among beams. Under such condition the satellite time-division switching matrix 29 follows a cyclic pattern and establishes connections among the various beams on a subframe basis per each switching frame, where in FIG. 2 for exemplary purposes, the switching frame is designated T and each of the sequential subframes therein has a separate designation in the sequence $t_1-t_h$, where h represents the total number of down-link beams and equals 12 for the exemplary system having 11 fixed up-link and down-link spot beams and one up-link and down-link scanning spot beam. In FIG. 2 up-link fixed spot beam $12a$ is shown sequentially connected by switching matrix 29 to down-link beams $A(13a)$, $B(13b)$, . . . , $K(13k)$, and $S(15)$ once during each switching frame period T. Concurrent therewith, up-link fixed spot beam $12b$ is sequentially connected by switching matrix 29 to down-link beam $B(13b)$, $C(13c)$, . . . , $S(15)$ and $A(13a)$ while up-link scanning spot beam 14 is sequentially connected to down-link beams S(15), A(13a), ..., J(13j) and K(13k) during switching frame period T. Similarly all other up-link fixed spot beams 12c–12k are concurrently connected to the various down-link fixed spot beams 13a–13k and scanning spot beam 15 in a sequence which assures that no two up-link beams are connected at any instant of time to the same down-link beam. It is to be understood that the sequences shown in FIG. 2 for the switching of signals between up-link beams 12a–12k and 14 and down-link beams 13a–13k and 15 are merely illustrative of a typical set of sequences of which there are many other possibilities.

Equal traffic among the beams as shown in FIG. 2 does not reflect a time traffic need between ground areas. A more realistic system may consist of different size subframes as shown typically in FIG. 3. To arrive at such an arrangement, the interbeam traffic requirements among the 12 beams must be tabulated in a matrix form and then assigned the subframes in accordance with the actual traffic needs. A basic requirement would be that the total length of the time slot dedicated to, for example, transmissions from Spot A ground area to Spot B ground area per switching frame be proportional to the traffic need between these two ground areas. One obvious consequence which differs from the uniform traffic model is that the connection between any two spots may have to be split up into disjointed time slots in order to avoid conflicts with other links. Shown in FIG. 3 is a conceptual switching arrangement where the up-link spot beam C is connected to the down-link spot beam D at two different times to avoid conflicts with the link between up-link spot beam B and down-link spot beam D.

FIG. 4 illustrates a more detailed sequence for the up-link spot beam 12a shown in FIG. 2. There, each of the subframes $t_1$–$t_{12}$ (A-K and S) in each frame associated with signals to be transmitted via down-link spot beams 13a–13k and 15, respectively, is shown including an exemplary 13 time slots some of which may contain bursts of information with each burst of information including n bits comprising a preamble portion and an information portion as is well known in the art. The preamble portion for each burst generally includes information in various formats associated with, inter alia, carrier and timing recovery, start of message, destination address, the source address, the type of information included in the information portion of the burst and possibly frame marker indications. Each of bursts 1–13 of a subframe can be selectively assignable for transmissions between a particular transmitting ground station associated with the particular up-link beam and a particular destination ground station associated with the down-link beam to which the subframe interval including such burst is switched. For example, assuming a switching frame length of 250 μsec and informational content of 800 bits per burst, if a voice circuit is needed between a ground station 1 and a ground station 3 in ground area A associated with beams 12a and 13a, then such requirement can be met by assigning, for example, burst 1 of subframe A in each of switching frame 1, 101, 201, 301, ..., etc. thereto as is known in the art to provide the proper bit rate of 32 kbit/sec.

For signaling purposes, however, 32 kbits/sec would far exceed the normal requirements in most systems, and more properly a requirement of only, for example, a 3.2 kbit/sec signaling transmission may be required. To provide such an exemplary signaling requirement in conjunction with the hereinabove described method of assigning voice circuits, a format can be provided which forms, for example, a 1000 switching frame sequence into a superframe format which then provides 13000 time slots (13 time slots ×1000 switching frames) for selective assignment between ground stations serviced by a particular up-link beam 12a–13k or 14 and ground stations serviced by a particular down-link beam 13a–13k or 15. In this manner, if 1000 bursts are required between a first and a second ground station, this requirement can be met by assigning one burst in each of the subframes of the 1000 switching frames of the superframe which provides communication between the ground areas associated with the first and second ground areas. Alternatively, two bursts in alternate switching frames or four bursts in every fourth switching frame, etc. could be assigned to such requirement and still provide 1000 bursts per superframe, but for any of these alternative assignments techniques the buffering requirements at the first and second ground stations would be increased over the one burst per switching frame technique. It is to be understood that where less than 1000 bursts are required between any two ground stations, the alternative assignment technique just described would be used to provide the necessary traffic requirements between ground stations. Traffic requirements between ground stations associated with each of the up-link and down-link scanning beams would be similarly assigned except that it might be desirable to assign sequential bursts of a switching frame to such requirement to reduce the scanning sequence of each scanning beam.

With the foregoing as background information, in accordance with the present invention, it will be considered hereinafter that one of the 100 ground stations in the ground area associated with up-link spot beam 12a is the master signaling station for transmitting signaling information to all other ground stations within the system and for receiving signaling information from such ground stations. To effect signaling between the master signaling station and each of the ground stations in the system, a separate time slot in an appropriate subframe in the superframe format will be dedicated for signaling purposes only between the master signaling station and each of the ground stations.

Figure 5:
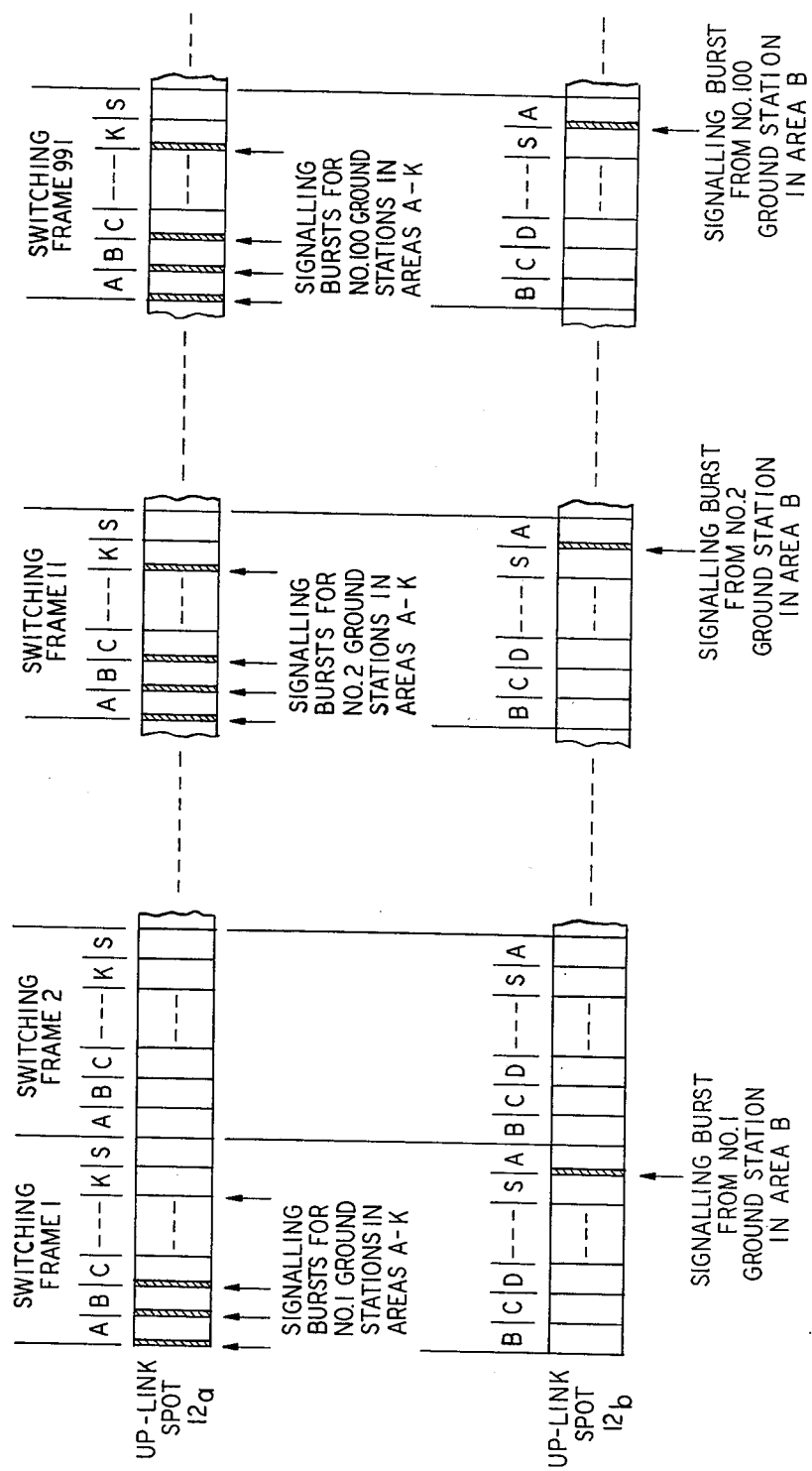
FIG. 5 illustrates an exemplary format for assigning dedicated channels for signaling information transmission between a master signaling ground station and each of 100 ground stations in each of the fixed spot beam areas.
Figure 6:
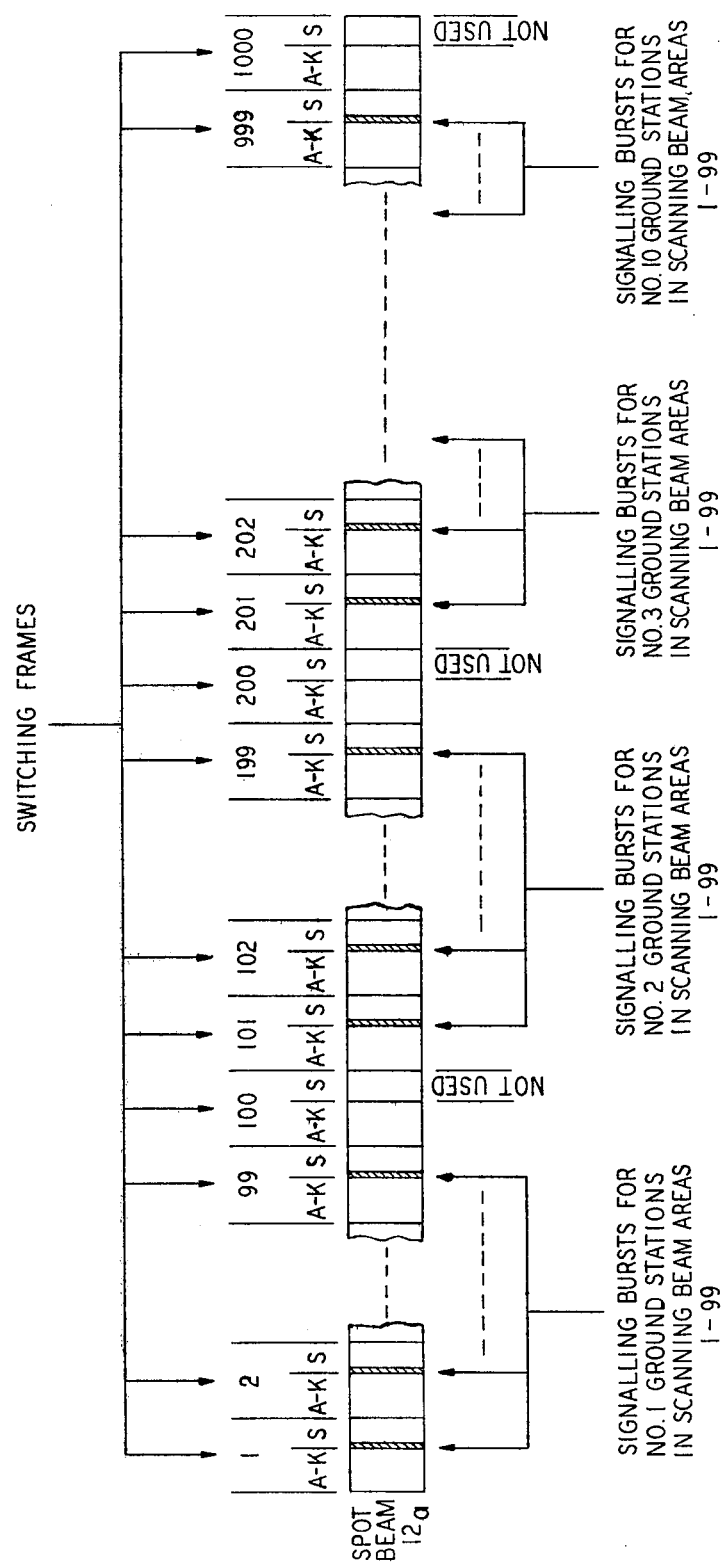
FIG. 6 illustrates an exemplary format for assigning dedicated channels for signaling information transmission from a master signaling ground station and each of 10 ground stations in each of 99 scanning beam ground areas.

A typical format, in accordance with the present invention, for interchanging signaling information between the master signaling station and the ground stations of the exemplary system within the format of FIG. 4 is illustrated in FIGS. 5 and 6 for the fixed spot beam ground areas and scanning beam ground areas, respectively. In the exemplary system, the master signaling ground station was assumed to be located in fixed spot beam ground area A and, therefore, transmits up-link signaling information in spot beam 12a and via satellite 10 to the 100 ground stations in each of the 11 exemplary fixed spot beam ground areas via spot beams 13a–13k.

Referring to FIG. 5, a signaling information transmission format is shown wherein time slot 1 of each of subframes A-K in switching frame 1 of the 1000 frame superframe format is dedicated for transmitting only signaling information from the master signaling station to a first one of the ground stations in each of ground areas A-K, respectively. In switching frame 11, time slot 1 of each of subframes A-K is dedicated for transmitting only signaling information from the master signaling station to a second one of the ground stations in each of ground areas A-K, respectively. The format then continues in the same manner such that every 10$^{th}$ switching frame of the superframe format dedicates one time slot in each of the A-K subframes for signaling to the next ground station in each fixed spot beam ground area until in switching frame 991 each of the A-K subframes have time slot 1 dedicated for transmitting signaling information to each of the number 100 ground stations in each of the fixed spot beam ground areas.

With such an arrangement, each of the 100 ground stations receives n bits, which for exemplary purposes could be 800 bits, from the master signaling station every 0.25 seconds if it is assumed that each switching frame has a duration of 250 μsec. The total capacity taken by these signaling channels to each ground area is 100 time slots out of the 13,000 time slots available for assignment between fixed beam ground area A and each of the fixed beam ground areas A-K during the 1000 frame superframe sequences. It is to be understood that the signaling strategy repeats starting with switching frame 1001.

To provide similar return signaling capabilities from each fixed spot beam associated ground station to the master signaling station, a typical format for the ground stations in fixed spot beam ground area B is shown in FIG. 5. Since ground stations in ground area B use up-link spot beam 12b and the master signaling station is located in ground area A, the signaling burst from ground station 1 in area B to the master ground station is shown transmitted in dedicated time slot 1 of subframe A in switching frame 1 in the superframe format associated with up-link fixed spot beam 12b. Ground station 2 in ground area B uses dedicated time slot 1 in subframe A of switching frame 11 to transmit signaling information to the master signaling station. In a similar manner, a separate one of the remaining ground stations uses time slot 1 of subframe A of every subsequent 10th switching frame for signaling to the master signaling station. Ground stations in other ground areas would use a similar format in the associated up-link superframe format.

It is to be understood that the assignments of dedicated signaling time slots in FIG. 5 is exemplary only and is for purposes of exposition and not for purposes of limitation. It will be readily appreciated that the inventive concept described can also be accomplished by arbitrarily assigning the various dedicated signaling time slots to any of the time slots within an appropriate subframe anywhere within the superframe format and in any order. It is also to be understood that the superframe sequence can include more or less switching frames and that the present concept can be easily applied to an area coverage satellite system superframe format by a person skilled in the art by, for example, using a format similar to that for spot beams 12a of FIG. 5 where each switching frame may be dedicated for up-link signals from a separate one of the system's ground areas. With an area coverage format, dedicated time slots for two-way signaling would be appropriately assigned in the superframe format to provide such signaling in a manner similar to that hereinbefore described.

FIG. 6 illustrates a typical format for assigning dedicated signaling time slots in the superframe format of FIG. 4 or 5 to permit the master signaling station to transmit signaling information to each of the 10 ground stations in each of the exemplary 99 scanning beam ground areas. As shown in FIG. 6, time slot 1 in subframe S of switching frames 1-99 of the superframe format for up-link spot beam 12a are dedicated for transmitting n bits of signaling information from the master signaling station to a first one of the 10 ground stations in each of the scanning beam ground areas 1-99, respectively. The 100th switching frame is not used for signaling and may be reserved, for example, for scanning beam housekeeping functions.

Switching frames 101 through 199 are similarly assigned to signaling with the No. 2 remote ground stations in each of the 99 scanning beam regions. By repeating this process 10 times through switching frame 999, dedicated signaling links to all the 990 scanning beam ground stations are established and the assignment strategy repeats. Return signaling channels are similarly assigned in the superframe format for up-link scanning beam 14. It is to be understood that the assignments depicted in FIG. 6 are exemplary only and not for purposes of limitations. It will be readily appreciated that any of the time slots within any of the S subframes could be dedicated to signaling bursts to the various scanning beam ground stations.

The dedicated signaling bursts or time slots format of FIGS. 5 and 6 can also be used for providing ranging and burst synchronization capabilities for each of the ground stations in the system to perhaps the order of nanoseconds at the satellite. The method of burst synchronization, in accordance with the present invention, comprises a coarse cold-start or open-loop mode and a continuous operation or close-loop mode. It is assumed hereinafter that each ground station is equipped with a fairly stable local clock. For example, commercially available oven controlled frequency standards are capable of maintaining stabilities of $\pm 1 \times 10^{-9}$/Minute, $\pm 5 \times 10^{-8}$/Day, and $\pm 1 \times 10^{-6}$/Year.

For the fixed spot beam ground stations, the master signaling station, at the beginning of each switching frame, distributes through the satellite switch 29 a synchronization burst or frame marker to all fixed spot beam regions simultaneously. The earth stations thus receive a reference frame marker every 250 μsec. The only other information required by a remote ground station is the required time interval between receipt of frame or superframe marker and beginning of transmission in order to hit its allocated window in the frame or superframe sequence at satellite switch 29.

To achieve the cold-start situation, any well-known open-loop ranging technique can be used wherein, for example, signals between the master signaling station and three slave stations can be used to calculate the satellite location to extreme accuracy. With careful site survey and accurate control of the local clocks at the earth stations, it has been shown that the master station can command any earth station to access the satellite with an uncertainty of no greater than $\pm 15$ nsec.

Since the signaling window or time slot is 1557 nsec in duration for a 250 μsec switching frame rate, and the final operation does not depend on open-loop ranging, the accuracy requirement during the cold-start mode may be greatly relaxed after using the master signaling station and three slave stations to calculate the satellite location via their signaling links. If a variation of no greater than $\pm 450$ nsec is allowed, there is still about 657 nsec or 200 symbols available in the signaling burst. With such a relaxed requirement, site survey and careful measurement of signal path becomes unnecessary.

Based on open-loop ranging and the stored earth station coordinates at the master signaling station, the master signaling station commands, via the signaling channel, a particular ground station to transmit a short unique word and hit its dedicated signaling window or time slot T μsec, where T≦250 μsec, after the reference frame marker. The ranging uncertainty of 450 nsec plus the maximum local clock variation of ±0.25 nsec ($\pm 1 \times 10^{-6} \times 250$ μs), will not prevent this ground station from hitting its dedicated 1557 μsec signaling window. Upon receiving the return signaling burst, the master signaling station detects the unique word contained in the dedicated signaling time slot and checks its arrival time. In closed-loop fashion, a command is then sent in the dedicated signaling burst for that ground station asking the ground station to advance or retard its clock to bring it into fine synchronization. By this close-loop check, an accuracy of 0.25 nsec can be maintained. Since the close-loop function takes about one second to complete, round-trip delay plus waiting for the appropriate signaling slot, satellite wander during this time makes any further refinement unrewarding.

To synchronize the scanning beam ground stations during every 100th switching frame, the master signaling station broadcasts, for a period of 250 μs, start-of-frame synchronization bursts to the 99 scanning locations sequentially. For this frame only, the up-link scanning beam 14 is directed at the master signaling ground station, and the down-link scanning beam 15 is sequentially scanned over the 99 scanning beam ground areas. Normal communications from other ground stations located within the same spot beam footprint as the master signaling station to other spot beam terminals are possible during this frame since the spot beams and the scanning beam would most probably employ orthogonal polarizations to prevent interference. Thus, the ground stations in the scanning beam areas receive a frame marker every 25 msec. In the start-up mode, a scanning beam ground station receives a command from the master signaling station to transmit a short unique word and hit its dedicated signaling window T ms, where T≦25 msec, after the receipt of a frame marker. The ranging uncertainty of no greater than ±450 nsec plus the local clock uncertainty of ±25 nsec ($\pm 1 \times 10^{-6} \times 25$ msec) present no problem in hitting the 1557 nsec dedicated signaling window or time slot. The master signaling station then determines the arrival time of the unique word signaling pulse and commands the ground station via the dedicated signaling burst to retard or advance its clock. Such system can only achieve an accuracy of ±25 nsec because of the local clock uncertainty. Further, refinements of the long-term clock accuracy such as calibrating out the daily aging effects can be accomplished. Additionally, if a local clock having an accuracy of $\pm 1 \times 10^{-7}$ is used, the burst position uncertainty is reduced to ±2.5 nsec and becomes comparable to satellite position changes of, for example, ±8.8 ft/sec over the period of time that the closed loop ranging is performed. Therefore, with a relaxed open-loop ranging arrangement, closed-loop synchronization is effected by the master signaling station commanding each ground station to hit its dedicated signaling slot. The master signaling station then uses the returned dedicated signaling burst to guide the various ground stations into their proper time slots.

It is to be understood that the above-described embodiments are simply illustrative of the principles of the invention. Various other modifications and changes may be made by those skilled in the art which will embody the principles of the invention and fall within the spirit and scope thereof. For example, framing signals to each of the ground stations can be originated from any one of the ground stations of the system other than the master signaling station. Additionally, the master signaling station can continuously monitor the signaling burst arrival time from each ground station to provide closed loop ranging and to transmit error correcting timing commands back to each ground station.

We claim:

1. A method of providing in-band signaling and ranging capabilities for a satellite communication system comprising a satellite and a plurality of spaced-apart ground areas disposed within the viewing area of the satellite with each ground area including at least one ground station and being associated with a particular concurrently propagating up-link and down-link beam for providing communication capabilities among the various ground areas on a time-division multiple access (TDMA) basis, the method comprising the steps of:
    (a) in each up-link beam, providing a TDMA sequence wherein a plurality of x consecutive frame sequences are combined to form a superframe sequence which is synchronized for arrival at the satellite with the superframe sequence associated with any other up-link beam, each frame sequence comprising y subframes with each subframe comprising a plurality of time slots; and
    (b) assigning each subframe within each frame sequence to a separate portion of the plurality of ground areas and in a manner so that no concurrent transmission from any two portions of the plurality of ground areas are destined for concurrent arrival at a same portion of the plurality of ground areas
CHARACTERIZED IN THAT
the method comprising the further steps of:
    (c) designating a particular ground station in one of the ground areas as a master signaling station;
    (d) dedicating a separate entire time slot in each superframe sequence associated with the master signaling station ground area for transmitting signaling information from the master signaling station to each of the ground stations in the system; and
    (e) dedicating a separate entire time slot in the associated superframe sequence for the transmission of signaling information from each ground station in the system to the master signaling station.

2. The method according to claim 1
CHARACTERIZED IN THAT
in performing step (d), assigning the dedicated separate time slot associated with correspondingly numbered ones of the ground stations in each portion of the plurality of ground areas to the associated subframe within a separate frame sequence of the superframe sequence.

3. The method according to claim 1 or 2
CHARACTERIZED IN THAT
the method comprises the further steps of:
    (f) at a predetermined interval, transmitting a unique coded signal from each ground station to the master signaling station within a predetermined portion of the time slot dedicated for signaling purposes only to each ground station in step (e);
    (g) measuring at the master signaling station the deviation of the received unique coded signal from said predetermined portion in the dedicated signaling time slot from each ground station in a superframe timing sequence; and (h) transmitting an error correcting signal in the time slots dedicated in step (d) from the master signaling station to each ground station for causing burst synchronization at each ground station in response to said error correcting signal.

4. A method of providing in-band signaling and ranging capabilities for a satellite communication system comprising a satellite and a plurality of spaced-apart ground areas disposed within the viewing area of the satellite with each ground area including at least one ground station and being associated with a particular concurrently propagating up-link and down-link beam for providing communication capabilities among the various ground areas on a time-division multiple access (TDMA) basis, the method comprising the steps of:
  (a) in each up-link beam, providing a TDMA sequence wherein a plurality of x consecutive frame sequences are combined to form a superframe sequence which is synchronized for arrival at the satellite with the superframe sequence associated with any other up-link beam, each frame sequence comprising y subframes with each subframe comprising a plurality of time slots; and
  (b) assigning each subframe within each frame sequence to a separate portion of the plurality of ground areas and in a manner so that no concurrent transmission from any two portions of the plurality of ground areas are destined for concurrent arrival at a same portion of the plurality of ground areas
  CHARACTERIZED IN THAT
  the method comprises the further steps of:
  (c) designating a particular ground station in one of the ground areas as a master signaling station;
  (d) at a ground station of the system, receiving a burst of information in an entire time slot during each superframe sequence dedicated to the transmission of signaling information only from the master signaling station and destined for said ground station; and
  (e) at said ground station of the system of step (d), transmitting a burst of information during an entire time slot in each superframe sequence dedicated to the transmission of signaling information only from said ground station to the master signaling station.

5. The method according to claim 4
CHARACTERIZED IN THAT
the method comprises the further steps of:
  (f) at a predetermined interval, transmitting a unique coded signal from said ground station to the master signaling station within a predetermined portion of said dedicated signaling time slot of step (e); and
  (g) receiving from the master signaling station an error correcting signal in said dedicated signaling time slot of step (d) for indicating a timing error of the received unique coded signal from the predetermined portion of the dedicated signaling time slot in a superframe timing sequence; and
  (h) updating a transmit timing sequence at said ground station in response to the error correcting signal received in step (g) for achieving or maintaining burst synchronization at said ground station.

6. A method of providing in-band signaling and ranging capabilities for a satellite communication system comprising a satellite and a plurality of spaced-apart ground areas disposed within the viewing area of the satellite with each ground area including at least one ground station and being associated with a particular concurrently propagating up-link and down-link beam for providing communication capabilities among the various ground areas on a time-division multiple access (TDMA) basis, the method comprising the steps of:
  (a) in each up-link beam, providing a TDMA sequence wherein a plurality of x consecutive frame sequences are combined to form a superframe sequence which is synchronized for arrival at the satellite with the superframe sequence associated with any other up-link beam, each frame sequence comprising y subframes with each subframe comprising a plurality of time slots; and
  (b) assigning each subframe within each frame sequence to a separate portion of the plurality of ground areas and in a manner so that no concurrent transmission from any two portions of the plurality of ground areas are destined for concurrent arrival at a same portion of the plurality of ground areas
  CHARACTERIZED IN THAT
  the method comprises the further steps of:
  (c) designating a particular ground station in one of the ground areas as a master signaling station;
  (d) at the master signaling station, transmitting a burst of information in a separate entire time slot during each superframe sequence dedicated to the transmission of signaling information only from the master signaling station to separate ones of the ground stations of the system; and
  (e) at said master signaling station, receiving a burst of information in a separate entire time slot during each superframe sequence dedicated to the transmission of signaling information only from the separate ones of the ground stations of the system to the master signaling station.

7. The method according to claim 6
CHARACTERIZED IN THAT
in performing step (d), assigning the dedicated separate time slots for signaling associated with correspondingly numbered separate ones of the ground stations in each portion of the plurality of ground areas within a separate frame sequence of the superframe sequence.

8. The method according to claim 6 or 7
CHARACTERIZED IN THAT
the method comprises the further steps of:
  (f) at a predetermined interval, receiving at the master signaling station a unique coded signal transmitted by one of the ground stations within a predetermined portion of the separated signaling time slot dedicated to said one of the ground stations in step (e);
  (g) measuring at the master signaling station the deviation of the unique coded signal received in step (f) from the predetermined portion of said dedicated separate signaling time slot in a superframe timing sequence; and
  (h) transmitting an error correcting signal from the master signaling station to said one of the ground stations in the time slot dedicated for signaling to that ground station in step (d) for causing burst synchronization at said one of the ground stations.

9. A method of providing in-band signaling and ranging capabilities for a satellite communication system comprising a satellite and a plurality of spaced-apart ground areas disposed within the viewing area of the satellite with each ground area including at least one ground station and being associated with a particular concurrently propagating up-link and down-link beam for providing communication capabilities among the various ground areas on a time-division multiple access (TDMA) basis, the method comprising the steps of:
  (a) in each up-link beam, providing a TDMA sequence wherein a plurality of x consecutive frame sequences are combined to form a superframe sequence which is synchronized for arrival at the satellite with the superframe sequence associated with any other up-link beam, each frame sequence comprising y subframes with each subframe comprising a plurality of time slots; and
  (b) assigning each subframe within each frame sequence to a separate portion of the plurality of ground areas and in a manner so that no concurrent transmission from any two portions of the plurality of ground areas are destined for concurrent arrival at a same portion of the plurality of ground areas
  CHARACTERIZED IN THAT
  the method comprises the further steps of:
  (c) designating a particular ground station in one of the ground areas as a master signaling station;
  (d) at a predetermined interval, transmitting only a unique coded signal from each ground station to the master signaling station within a predetermined portion of a separate entire time slot of the superframe sequence dedicated to the transmission of only signaling information from each ground station to the master signaling station;
  (e) measuring at the master signaling station the deviation of the received unique coded signal from said predetermined portion in the dedicated signaling time slot from each ground station in a superframe timing sequence; and
  (f) transmitting an error correcting signal from the master signaling station to each of the ground areas in a burst of information in a separate entire time slot of the superframe sequence dedicated to the transmission of only signaling information from the master signaling station to each of the ground stations for achieving or maintaining burst synchronization at each of the ground stations in response to said error correcting signal.

10. A method of providing in-band signaling and ranging capabilities for a satellite communication system comprising a satellite and a plurality of spaced-apart ground areas disposed within the viewing areas of the satellite with each compound area including at least one ground station and being associated with a particular concurrently propagating up-link and down-link beam for providing communication capabilities among the various ground areas on a time-division multiple access (TDMA) basis, the method comprising the steps of:
  (a) in each up-link beam, providing a TDMA sequence wherein a plurality of x consecutive frame sequences are combined to form a superframe sequence which is synchronized for arrival at the satellite with the superframe sequence associated with any other up-link beam, each frame sequence comprising y subframes with each subframe comprising a plurality of time slots; and
  (b) assigning each subframe within each frame sequence to a separate portion of the plurality of ground areas and in a manner so that no concurrent transmission from any two portions of the plurality of ground areas are destined for concurrent arrival at a same portion of the plurality of ground areas
  CHARACTERIZED IN THAT
  the method comprises the further steps of:
  (c) designating a particular ground station in one of the ground areas as a master signaling station;
  (d) at a predetermined interval, transmitting a unique coded signal from a separate one of the ground stations of the system to the master signaling station within a predetermined portion of a separate entire time slot dedicated to the transmission of signaling information from said separate one of the ground stations to said master signaling station during the superframe sequence; and
  (e) receiving from the master signaling station an error correcting signal in a burst of information in a separate entire time slot during the superframe sequence dedicated to the transmission of signaling information from the master signaling station to said separate one of the ground stations for indicating a timing error of the unique coded signal received by the master signaling station from the predetermined portion of the dedicated signaling time slot in a superframe timing sequence; and
  (f) updating a transmit timing sequence at said separate one of the ground stations in response to said error correcting signal received in step (e) for achieving or maintaining burst synchronization at said ground station.

11. A method of providing in-band signaling and ranging capabilities for a satellite communication system comprising a satellite and a plurality of spaced-apart ground areas disposed within the viewing area of the satellite with each ground area including at least one ground station and being associated with a particular concurrently propagating up-link and down-link beam for providing communication capabilities among the various ground areas on a time-division multiple access (TDMA) basis, the method comprising the steps of:
  (a) in each up-link beam, providing a TDMA sequence wherein a plurality of x consecutive frame sequences are combined to form a superframe sequence which is synchronized for arrival at the satellite with the superframe sequence associated with any other up-link beam, each frame sequence comprising y subframes with each subframe comprising a plurality of time slots; and
  (b) assigning each subframe within each frame sequence to a separate portion of the plurality of ground areas and in a manner so that no concurrent transmission from any two portions of the plurality of ground areas are destined for concurrent arrival at a same portion of the plurality of ground areas
  CHARACTERIZED IN THAT
  the method comprises the further steps of:
  (c) designating a particular ground station in one of the ground areas as a master signaling station;
  (d) at a predetermined interval, receiving at the master signaling station a unique coded signal which was transmitted by a separate one of the ground stations of the system within a predetermined portion of a separate entire time slot dedicated to the transmission of signaling information from said separate one of the ground stations to said master signaling station during the superframe sequence;
  (e) measuring at the master signaling station the deviation of the unique coded signal received in step (d) from the predetermined portion of said dedicated separate signaling time slot in a superframe timing sequence; and (h) transmitting an error correcting signal from the master signaling station to said separate one of the ground stations in a separate entire time slot during the superframe sequence dedicated to the transmission of only signaling information from the master signaling station to said separate one of the ground stations for causing burst synchronization at said separate one of the ground stations in response to the error correcting signal.

* * * * *